US007587387B2

(12) United States Patent
Hogue

(10) Patent No.: US 7,587,387 B2
(45) Date of Patent: Sep. 8, 2009

(54) USER INTERFACE FOR FACTS QUERY ENGINE WITH SNIPPETS FROM INFORMATION SOURCES THAT INCLUDE QUERY TERMS AND ANSWER TERMS

(75) Inventor: Andrew William Hogue, Pompton Lakes, NJ (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 11/097,689

(22) Filed: Mar. 31, 2005

(65) Prior Publication Data
US 2006/0224582 A1 Oct. 5, 2006

(51) Int. Cl.
G06F 7/00 (2006.01)
G06F 17/30 (2006.01)
(52) U.S. Cl. .................................. 707/3; 707/4; 707/5
(58) Field of Classification Search .................. 707/2–5
See application file for complete search history.

(56) References Cited
U.S. PATENT DOCUMENTS

| 6,006,221 A * | 12/1999 | Liddy et al. ..................... 707/5 |
| 6,519,631 B1 * | 2/2003 | Rosenschein et al. ....... 709/217 |
| 6,584,464 B1 * | 6/2003 | Warthen ......................... 707/4 |
| 6,643,641 B1 * | 11/2003 | Snyder ............................ 707/4 |
| 2003/0069880 A1 | 4/2003 | Harrison et al. ................. 707/3 |
| 2004/0255237 A1 | 12/2004 | Tong ......................... 715/501.1 |

FOREIGN PATENT DOCUMENTS
WO   WO 2004/114163 A2   12/2004

OTHER PUBLICATIONS

Ogden et al., "Improving Cross-Language Text Retrieval with Human Interactions", Proc. Of the 33rd Hawaii International Conference on System Sciences, IEEE, 2000.*
Brin et al., "The Anatomy of a Large-Scale Hypertextual Web Search Engine", Computer Networks and ISDN Systems 30, 1998, pp. 107-117, Elsevier Science B.V.*
International Search Report for International Application No. PCT/US2006/010965, dated Jul. 5, 2006.

* cited by examiner

Primary Examiner—Christian P. Chace
Assistant Examiner—Michael J Hicks
(74) Attorney, Agent, or Firm—Morgan, Lewis & Bockius LLP

(57) ABSTRACT

A method and a system for providing snippets of source documents of an answer to a fact query are disclosed. Snippets of source documents may be provided in response to a user request for the source documents from which the fact answer to a fact query was extracted. The snippets include the terms of the fact query and terms of the answer. The snippets may be displayed along with Uniform Resource Locators (URL's) of the source documents.

18 Claims, 10 Drawing Sheets

USER INTERFACE FOR FACTS QUERY ENGINE WITH SNIPPETS FROM INFORMATION SOURCES THAT INCLUDE QUERY TERMS AND ANSWER TERMS

RELATED APPLICATIONS

This application is related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,676, "Bloom Filters for Query Simulation," filed on Mar. 31, 2005;

U.S. patent application Ser. No. 11/097,690, "Selecting the Best Answer to a Fact Query from Among a Set of Potential Answers," filed on Mar. 31, 2005; and U.S. patent application Ser. No. 11/024,784, "Supplementing Search Results with Information of Interest," filed on Dec. 30, 2004.

TECHNICAL FIELD

The disclosed embodiments relate generally to queries for facts, and more particularly, to a user interface for a factual query engine and snippets of sources with query terms and answer terms.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." Web search engines, however, may be unhelpful to users in this regard, as they generally do not provide a simple, succinct answer to factual queries such as the ones described above. Rather, Web search engines provide a list of Web pages that are determined to match the query to the user, and the user has to sort through the matching Web pages to find the answer.

Attempts that have been made to build search engines that can provide quick answers to factual questions have their own shortcomings. For example, some search engines draw their facts from a single source, such as a particular encyclopedia. This limits the types of questions that these engines can answer. For instance, a search engine based on an encyclopedia is unlikely to be able to answer many questions concerning popular culture, such as questions about movies, songs or the like, and is also unlikely to be able to answer many questions about products, services, retail and wholesale businesses and so on. If the set of sources used by such a search engine were to be expanded, however, such expansion might introduce the possibility of multiple possible answers to a factual query, some of which might be contradictory or ambiguous. Furthermore, as the universe of sources expands, information may be drawn from untrustworthy sources or sources of unknown reliability.

SUMMARY

According to an aspect of the invention, a method for displaying sources of a fact includes receiving a factual query that includes one or more terms, identifying an answer to the factual query that includes one or more terms, identifying one or more source documents that include one or more terms of the query and one or more terms of the answer, generating a snippet of at least one source document, with the snippet including one or more terms of the query and one or more terms of the answer, and generating a response that includes the snippet.

BRIEF DESCRIPTION OF THE DRAWINGS

Like reference numerals refer to corresponding parts throughout the drawings.

DESCRIPTION OF EMBODIMENTS

A query engine can store factual information gathered from many disparate sources and return answers in response to queries for factual information (or "factual queries") from a user. Gathering information from many sources expands the scope of available factual information for the query engine, but also introduces the possibility of multiple possible answers. The query engine may identify possible answers and select a best answer from the possible answers to present to the user, or it may determine that none of the possible answers are presentable to the user. The query engine may also provide a list of sources of the answer, including portions of text from each source. The portion or portions of text is called a snippet and may include terms of the factual query and terms of the answer. While a snippet shows the answer identified or selected by the search engine, the list of sources provide the user with the basis for the answer and may aid the user in evaluating the veracity of the answer.

Figure 1:
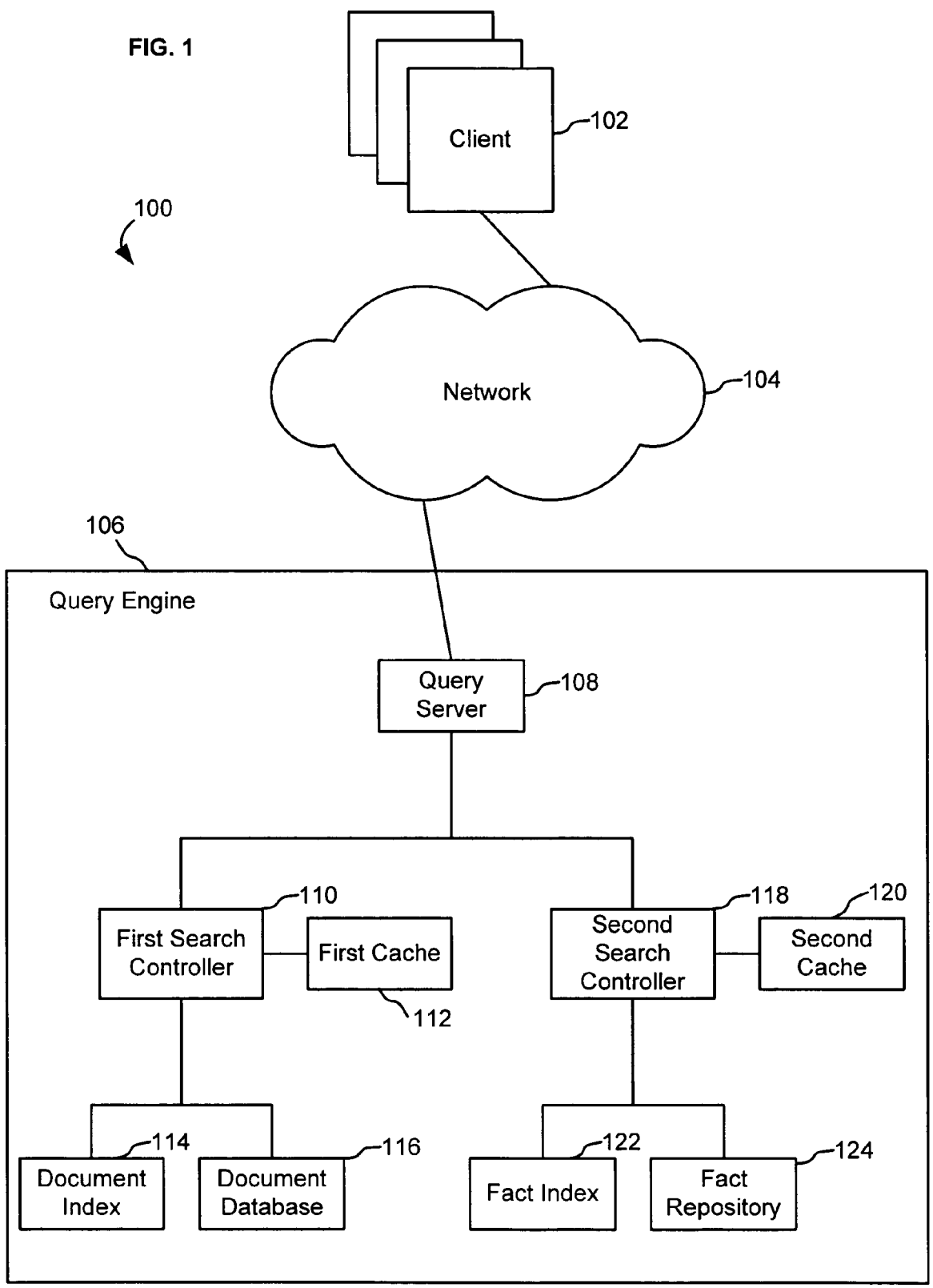
FIG. 1 illustrates a network, according to some embodiments of the invention.

FIG. 1 illustrates a network 100, according to some embodiments of the invention. Network 100 includes a one or more clients 102 and a query engine 106. A client 102 may include a client application (not shown). The network 100 also includes one or more communication networks 104 that couple these components.

The client application provides a user (not shown) of client 102 an interface to the query engine 106. Using a client application that runs on client 102, the user can submit searches for documents (for example, Web searches) and factual queries to the query engine 106 and view responses from the query engine 106. The client application may include web browsers. Examples of web browsers include FIREFOX, INTERNET EXPLORER, and OPERA.

The query engine 106 provides a platform for storing factual information and responding to factual queries, as well as handling other types of searches. The query engine 106 can handle searches for documents, such as Web searches, and queries for factual information. The query engine 106 includes a query server 108. The query server 108 provides a front-end to the query engine 106. The query server 108 receives queries from the client 102, directs queries to components of the query engine 106 that handle factual queries and other searches, generates responses, and transmits responses to the client 102. The query server 108 may be distributed over multiple computers. In other embodiments, more or fewer functions may be handled by the query engine. For instance, in other embodiments response generation may be handled elsewhere in the query engine 106.

The query engine 106 includes a first search controller 110, a first cache 112, a document index 114, and a document database 116 for handling document searches. In some embodiments, these components may be deployed over multiple computers in order to provide fast access to a large number of documents. For example, the document database 116 may be deployed over N servers, with a mapping function such as the "modulo N" function being used to determine which documents are stored in each of the N servers. N may be an integer greater than 1, for instance an integer between 2 and 8196. Similarly, the document index 114 may be distributed over multiple servers, and the first cache 112 may also be distributed over multiple servers. Furthermore, the first search controller 110 may also be distributed over multiple computers.

The first search controller 110 is coupled to the query server 108. The first search controller 110 is also coupled to the first cache 112, the document index 114 and the document database 116. The first search controller 110 may be configured to receive document search queries from the query server 108 and transmit the queries to the first cache 112, the document index 114, and the document database 116. The first cache 112 may be used to increase search efficiency by temporarily storing previously located search results.

The first search controller 110 receives the document search results from the first cache 112 and/or the document index 114 and constructs an ordered search result list. The first search controller 110 then returns a list of located documents back to the query server 108 for onward transmittal to the client 102. The document search results received by the first search controller 110 from the first cache 112 and/or the document index 114 may be accompanied by snippets of the located documents in the search results.

The query engine 106 also includes a second search controller 118, a second cache 120, a fact index 122, and a fact repository 124. In some embodiments, these components may be deployed over multiple computers in order to provider faster access to a large number of facts. For example, the fact repository 124 may be deployed over N servers, with a mapping function such as the "modulo N" function being used to determine which facts are stored in each of the N servers. N may be an integer greater than 1, for instance an integer between 2 and 8196. Similarly, the fact index 122 may be distributed over multiple servers, and the second cache 120 may also be distributed over multiple servers. Furthermore, the second search controller 118 may also be distributed over multiple computers.

The second search controller 118 is coupled to the query server 108. The second search controller 118 is also coupled to the second cache 120, the fact index 122 and the fact repository 124. The second search controller 118 may be configured to receive queries for answers to factual questions from the query server 108 and transmit the queries to the second cache 120 and to the fact repository 124 (via the fact index 122). The second cache 120 may be used to increase fact retrieval efficiency by temporarily storing previously located search results.

The second search controller 118 receives facts that are possible answers to a factual query from the second cache 120 and/or the fact repository 124. The second search controller 118 selects an answer from the possible answers as the best answer to present to the user. That answer is transmitted to the query server 108, where a response including that answer is generated and transmitted to the client 102 for presentation to the user. In response to user selection of an icon displayed at or next to an answer to a factual query, the query server 108 may identify a list of sources associated with the answer and transmit the list of sources to the first search controller 110. The first search controller 110 accesses documents that correspond to the sources and snippets for at least a subset of the source documents. In some embodiments, the snippets include terms from the query and terms from the answer.

The fact repository 124 stores factual information extracted from a plurality of documents. A document from which a particular fact may be extracted is a source document (or "source") of that fact. In other words, a source of a fact includes that fact within its contents. Sources documents may include, without limitation, Web pages. Within the fact repository 124, entities, concepts, and the like for which the fact repository 124 may have factual information stored are represented by objects. An object may have one or more facts associated with it. Each object is a collection of facts; an object that has no facts associated with it (an empty object) may be viewed as a non-existent object within the fact repository 124. Within each object, each fact associated with the object is stored as an attribute-value pair. Each fact also includes a list of source documents that include the fact within their contents and from which the fact was extracted. Further details about objects and facts in the fact repository are described below, in relation to FIG. 2.

To lookup information in the fact repository 124, the second search controller 118 searches the fact index 122 for the terms in the search query. This results in lists of fact repository locations (i.e., which correspond to facts or objects) that match the various terms in the search query. Using the logical structure of the search query (which may be considered to be a Boolean expression or tree), the second search controller 118 then forms logical combinations of these location lists to identify possible facts, if any, that match the search query.

The fact index 122 provides an index to the fact repository 124 and facilitates efficient lookup of information in the fact repository 124. The fact index 122 may index the fact repository 124 based on one or more parameters. For example, the fact index 122 may have an index (which may be called a main index or term index) that indexes unique terms to locations within the fact repository 124. Further details about the fact index 122 are described below, in relation to FIG. 3.

It should be appreciated that while any of the components of the query engine 106 may be distributed over multiple computers, for convenience of explanation, we will discuss the components of the query engine 106 as though they were implemented on a single computer.

Figure 2:
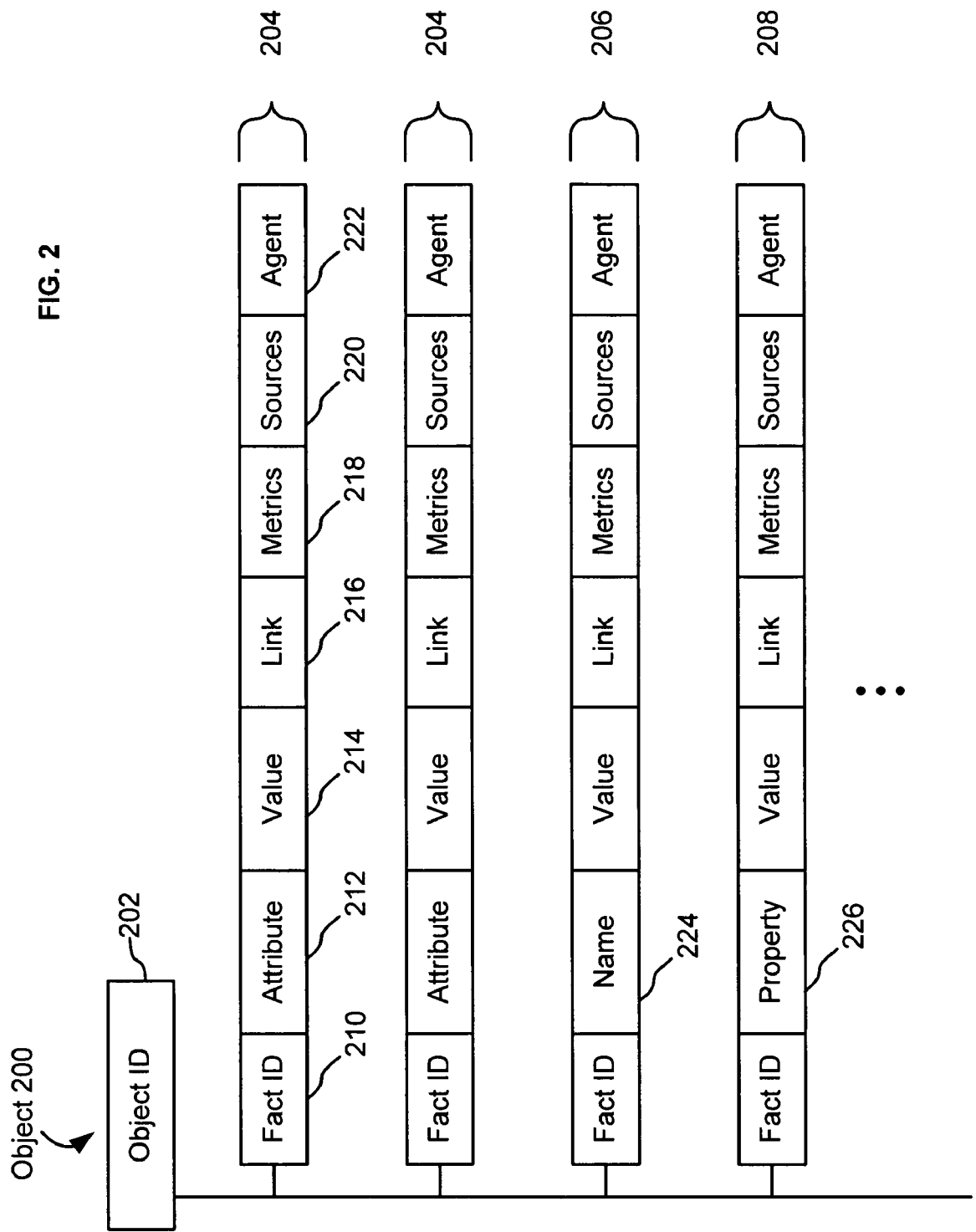
FIG. 2 illustrates a data structure for an object and associated facts in a fact repository, according to some embodiments of the invention.

FIG. 2 illustrates an exemplary data structure for an object within the fact repository 124, according to some embodiments of the invention. As described above, the fact repository includes objects, each of which may include one or more facts. Each object 200 includes a unique identifier, such as the object ID 202. The object 200 includes one or more facts 204. Each fact 204 includes a unique identifier for that fact, such as a Fact ID 210. Each fact 204 includes an attribute 212 and a value 214. For example, facts included in an object representing George Washington may include facts having attributes of "date of birth" and "date of death," and the values of these facts would be the actual date of birth and date of death, respectively. A fact 204 may include a link 216 to another object, which is the object identifier, such as the object ID 202 of another object within the fact repository 124. The link 216 allows objects to have facts whose values are other objects. For example, for an object "United States," there may be a fact with the attribute "president" whose value is "George W. Bush,", with "George W. Bush" being another object in the fact repository 124. In some embodiments, the value field 214 store the name of the linked object and the link 216 stores the object identifier of the linked object. In some other embodiments, facts 204 do not include a link field 216 because the value 214 of a fact 204 may store a link to another object.

Each fact 204 also may include one or more metrics 218. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. In other words, the importance level measures how vital a fact is to an understanding of the entity or concept represented by the object.

Each fact 204 include a list of sources 220 that include the fact and from which the fact was extracted. Each source may be identified by a Uniform Resource Locator (URL), or Web address.

In some embodiments, some facts may include an agent field 222 that identifies the module that extracted the fact. For example, the agent may be a specialized module that extracts facts from a specific source, or a module that extracts facts from free text in documents throughout the Web, and so forth.

In some embodiments, an object 200 may have one or more specialized facts, such as a name fact 206 and a property fact 208. A name fact 206 is a fact that conveys a name for the entity or concept represented by the object 200. For example, for an object representing the country Spain, there may be a fact conveying the name of the object as "Spain." A name fact 206, being a special instance of a general fact 204, includes the same parameters as any other fact 204; it has an attribute, a value, a fact ID, metrics, sources, etc. The attribute 224 of a name fact 206 indicates that the fact is a name fact, and the value is the actual name. The name may be a string of text. An object 200 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office."

A property fact 208 is a fact that conveys a statement about the entity or concept represented by the object 200 that may be of interest. For example, for the object representing Spain, a property fact may convey that Spain is a country in Europe. A property fact 208, being a special instance of a general fact 204, also includes the same parameters (such as attribute, value, fact ID, metrics, sources, etc.) as other facts 204. The attribute field 226 of a property fact 208 indicates that the fact is a property fact, and the value field is a string of text that conveys the statement of interest. For example, for the object representing Spain, the value of a property fact may be the text string "is a country in Europe." An object 200 may have zero or more property facts.

It should be appreciated that the data structure illustrated in FIG. 2 and described above is merely exemplary. The data structure of the fact repository 124 may take on other forms. Other fields may be included in facts and some of the fields described above may be omitted. Additionally, each object may have additional special facts aside from name facts and property facts, such as facts conveying a type or category (for example, person, place, movie, actor, etc.) for categorizing the entity or concept represented by the object. In some embodiments, an object's name(s) and/or properties are represented by special records that have a different format than the facts records 204 associated with the attribute-value pairs of an object.

Figure 3:
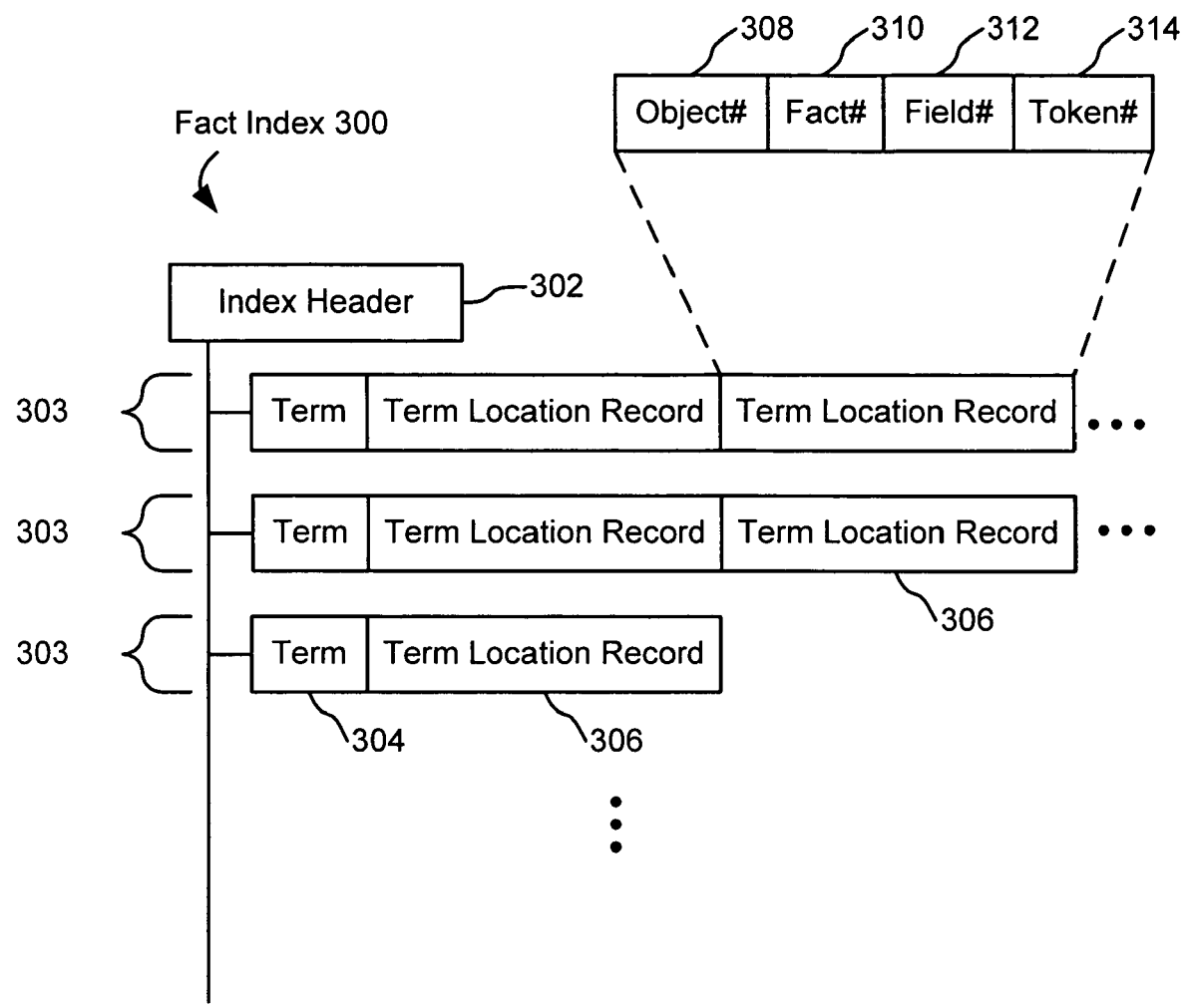
FIG. 3 illustrates a data structure for a fact index, according to some embodiments of the invention.

FIG. 3 illustrates an exemplary fact index, according to some embodiments of the invention. As described above, the fact index 122 may index the fact repository based on one or more parameters. In some embodiments, fact index 300 may be that index. The fact index 300 maps unique terms to facts, or to locations of information within the fact repository 124. As used herein, a term is a word (such as "Spain" or "George") or number (such as "123" or "-9"). In some embodiments, terms may also in include terms that contain two or more words, such as "United States" or "birth date." The fact index 300 includes multiple sets 303 of terms and associated term location records, and may optionally include an index header 302 with information about the index 300 (e.g., information about the size of the index, information about a mapping function used to locate the sets, etc.). Within each set 303 is a term 304 and one or more term location records 306 that identify the locations of each appearance of the term within the fact repository 124. Each term location record has an object identifier 308 (identifying the object where the term appears), a fact identifier 310 (identifying the fact within the object), a fact field identifier 312 (identifying the field within the fact), and a token identifier 314 (identifying the token within the field). These four fields map a term to a location in the fact repository 124. However, it should be appreciated that the fact index 300 is merely exemplary and other forms of the fact index 300 and other fact indexes are possible. In some embodiments, when a term location record 306 points to an object as a whole (e.g., the term is the name of the object), the fact identifier 310, field identifier 312 and token identifier 314 may have predefined or null values.

Figure 4:
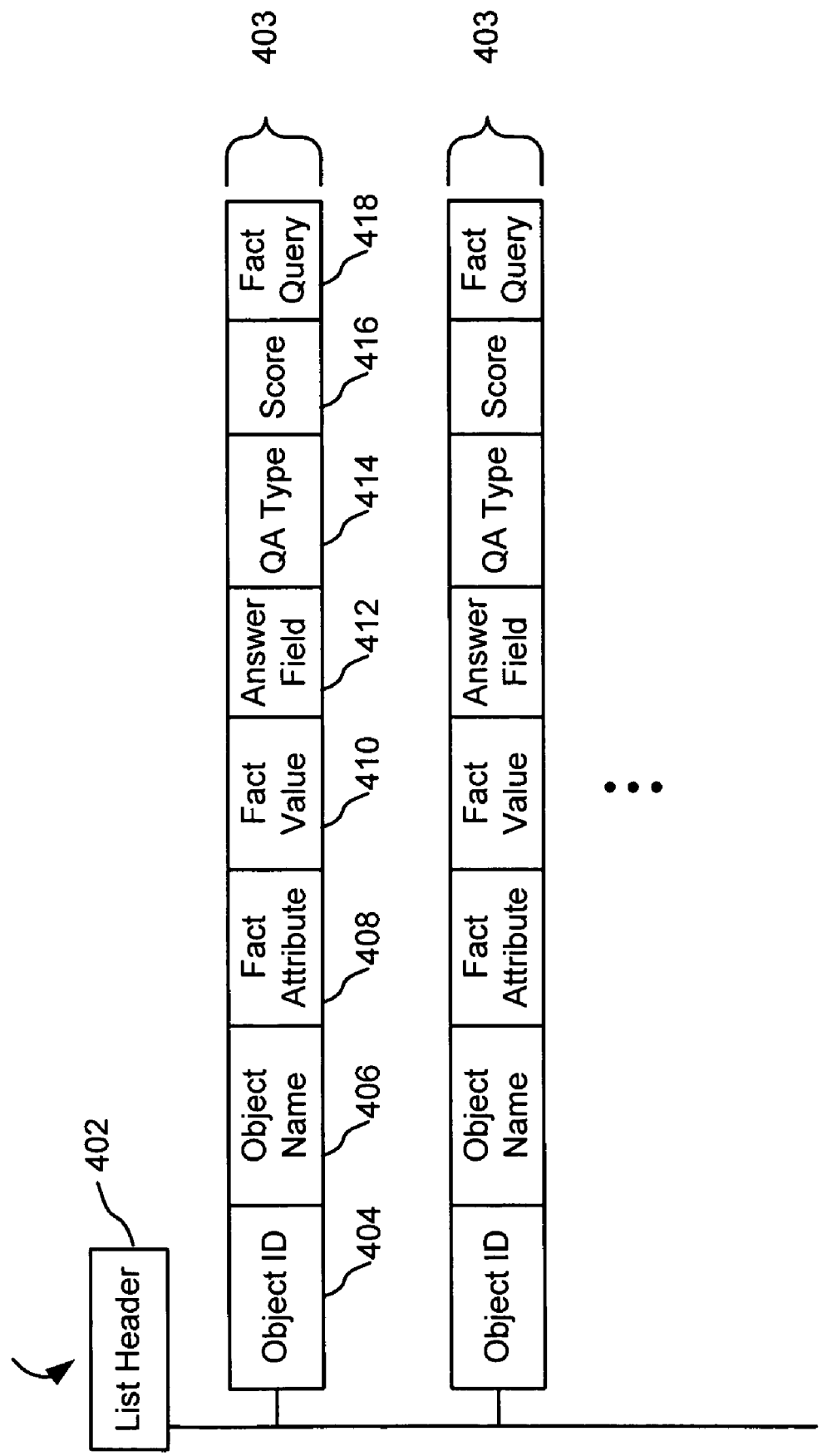
FIG. 4 illustrates a data structure for a list of possible answers, according to some embodiments of the invention.

FIG. 4 illustrates an exemplary list of possible answers to a factual query, according to some embodiments of the invention. The second search controller 118 receives a list of one or more possible answers to a factual query from the second cache 120 or from a search of the fact repository 124, selects the best answer from the list of possible answers, and transmits the best answer to the query server 108 for further processing, further details of which are described below, in relation to FIGS. 5A-5C. FIG. 4 illustrates an exemplary list of possible answers 400. The list 400 includes one or more possible answers 403. Each possible answer 403 has one or more fields. The object ID 404 identifies the object which included the fact that is a possible answer. The object name 406 identifies the name of the entity or concept represented by the object identified by the object ID 404. The object name 406 may be the value of a name fact included in the object (see above discussion of object data structure). The fact attribute 408 identifies the attribute of the fact that is a possible answer. The fact value 410 identifies the value of the fact that is a possible answer. The answer field 412 identifies which of three fields—object name 406, fact attribute 408, or fact value 410—has the actual answer that is responsive to the factual query (that is, the kind of answer the user is looking for). The QA type 414 identifies the type of question that is posed by the factual query (that is, the kind of question the user is asking and, by implication, the answer that is responsive to the kind of question being asked). The score 416 indicates a score for the possible answer. The score is a metric that attempts to measure the quality of the possible answer as an accurate and responsive answer. The fact query 418 is the internal query generated by the second search controller 118 that led to the identification of the possible answer as such. The fact query 418 is generated based on the user query (that is, the query as entered by the user at client 102). Further details about the QA type 414, the score 416, and the fact query 418 are described below, in relation to FIGS. 5A-5C. In some embodiments, possible answers 403 may be represented by more or fewer fields of information. In some embodiments, the list 400 includes a list header 402 that contains information applicable to the entire list 400. For instance, the header 402 may include a copy of the user query, a pointer to the top entry of the list 400, or other data structures for facilitating access to the items or records in the list 400.

Figure 5A:
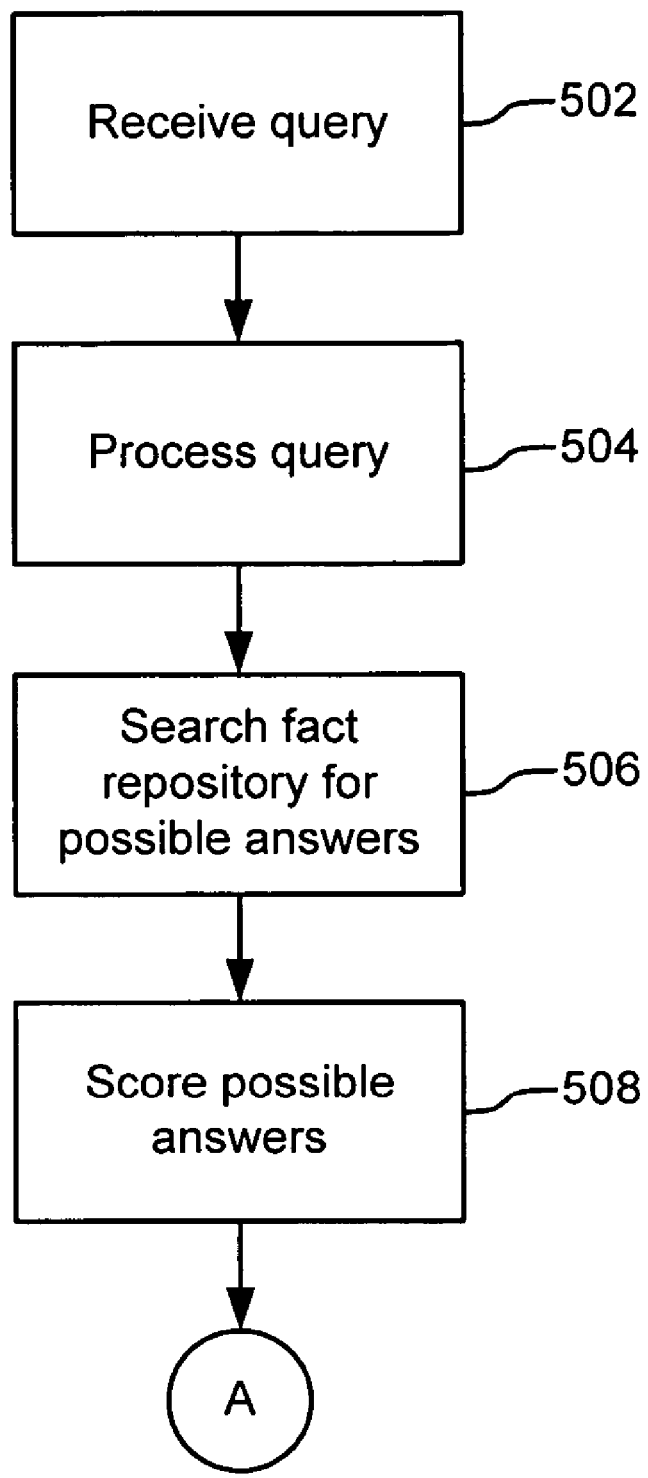
FIGS. 5A-5C are flow diagrams of a process for selecting an answer to a factual query and displaying the answer and sources of the answer, according to some embodiments of the invention.
Figure 5B:
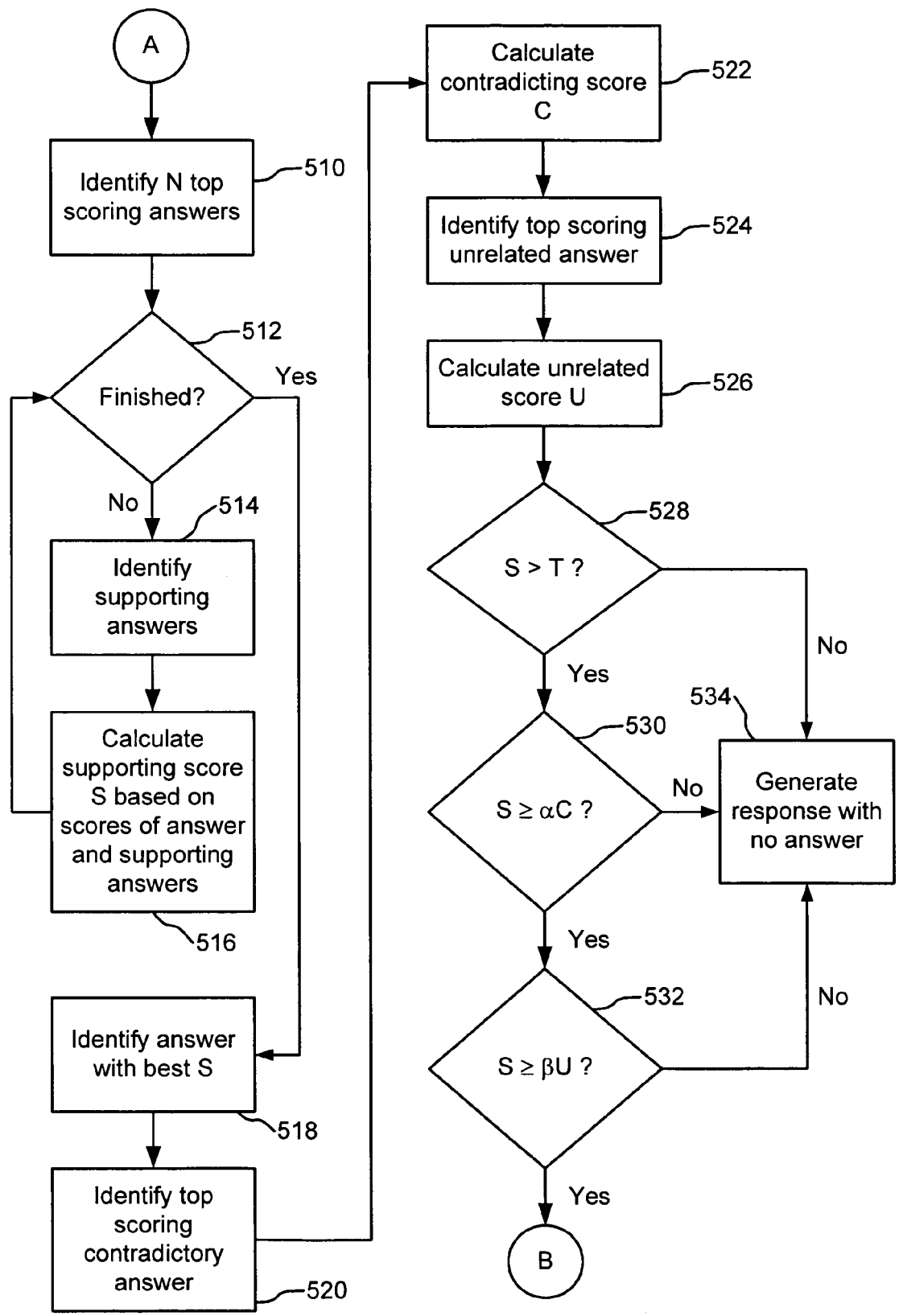
Figure 5C:
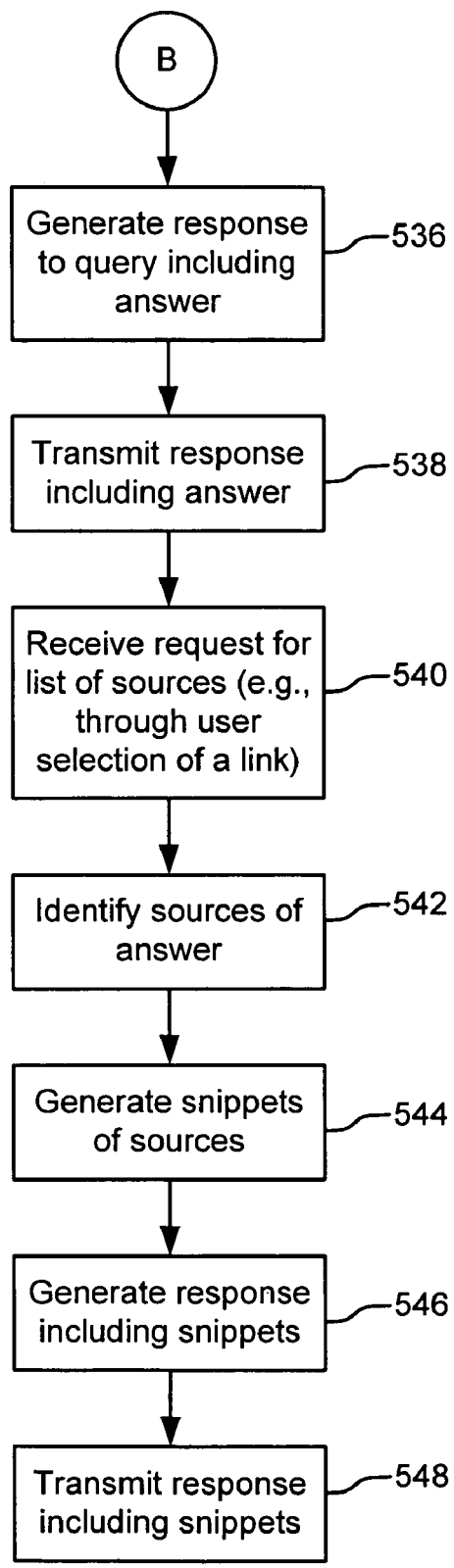

FIGS. 5A-5C illustrates an exemplary process for selecting a best answer to a factual query and presenting that answer, according to some embodiments of the invention. The answer to a factual query is the fact in the fact repository 124 that is identified as the best response to the factual query. Upon receiving a factual query, the query engine 106 processes the query, identifies possible answers, selects the best answer, and generates a response that includes the answer. The query engine 106 may also generate a response that includes a list of sources of the answer.

A query is received by the query engine 106 (502). The query was entered at the client 102 by the user and transmitted by the client 102 to the query engine 106. The query includes one or more terms. The query as entered by the user is the user query.

The user query is processed (504). The user query is transmitted to both the first search controller 110 and the second search controller 118. Because the user query includes one or more terms, it may be treated as a search query for documents, such as a Web search, and transmitted to system components that handle such searches, such as the first search controller 110. Searches for documents, such as Web searches, are well known in the art and need not be further described.

The user query is also transmitted to the second search controller 118. The user query is pre-processed and analyzed to determine if the user query fits into any of one or more QA types. The pre-processing may include dropping "stopwords" (such as definite and indefinite articles and prepositions) and expanding words and/or phrases within the user query to include their respective synonyms or equivalents. For example, a phrase "birth date" may be expanded to include its synonyms "date birth" (without the stopword "of") and "birthday." The analysis may include parsing the user query and analyzing the text of the user query. If the user query is determined to fit into any one of the QA types, a fact query corresponding to the respective QA type may be generated for the user query. The fact query is a query internal to the query engine 106 and used to access the second cache 120, and the fact repository 124 (via the fact index 122) for possible answers. If the user query is determined to not fit into any QA type, further processing by the second search controller 118 on the user query may be aborted, as the user query is, in the view the second search controller 118, not a factual query. It should be appreciated that a user query may be determined to fit into more than one QA type, and as a result, more than one fact query may be generated for a single user query. Each of these fact queries may be used to access the fact repository 124, second cache 120, and the fact index 122 for possible answers.

A user query may fit into one or more QA types. A QA type is a question-to-answer mapping that indicates what factual question is being asked by the user query and the kind of answer that is responsive to factual query. In some embodiments, there are three general QA types: name and attribute to value ("NA-V"); attribute and value, or property, to name ("AV-N"), and name to property, type, or name ("N-PTN"). In some embodiments, there may be additional specialized QA types to handle specific types of questions. In some embodiments, these specialized QA types may be specialized instances of the general QA types.

In the NA-V type, the user (by entry of a user query) provides an object name and an attribute and wants to know the value of the corresponding attribute for the object with the given name. An example of a NA-V type query may be "what is the capital of Poland," in which "Poland" is the object name and "capital" is the attribute of "Poland" for which the value is desired. The answer for this query would be the value of a fact, associated with the object with the name "Poland," and having the attribute "capital." In this case, the value of the fact with the "capital" attribute may be the string "Warsaw." The value may also be the object identifier for an object with name "Warsaw," in which case the name "Warsaw" may be substituted for the object identifier and returned as a possible answer.

In the AV-N type, the user provides an attribute and a value (or a property, since properties are merely specialized attribute-value pairs, as described above) and wants a name that has the given value for the given attribute. In a sense, this is a "reverse lookup." An example of an AV-N type query may be "which country has Warsaw as its capital," in which case "capital" is the attribute and "Warsaw" is the value. A possible answer may be the name of the object with this attribute-value pair, namely "Poland."

In the N-PTN type, the user provides a name and wants a property or type or alternate name of the object associated with the given name. One example of the N-PTN type query may be "what is the NRA." "NRA" is the name of the object for which the user wants a property, type or alternate name. One possible property answer for "NRA" is "a Second Amendment rights advocacy group." A type answer, which conveys a categorization of the entity or concept represented by an object, for "NRA" may be "organization," indicating that the NRA is an organization, as opposed to other types such as a person, book, movie, etc. An alternate name for "NRA" may be "National Rifle Association," which is the official name of the entity represented by the object with an (acronym) name "NRA."

In some embodiments, the fact query may include additional constraints. For example, the fact query may specify that a certain term may only match in a particular field and not other fields. Another constraint may be that any possible answer must match a specific type (such as person, book, etc.). Such constraints are generated by the second search controller 118 during analysis and processing of the user query.

After the user query is processed and one or more fact queries are generated, the fact queries are used to access the fact repository 124 (via the fact index 122) and second cache 120 for possible answers (506). The possible answers are the facts that match the fact query or queries. The possible answers are scored (508). The score for a possible answer provides an indication of the quality of the possible answer as an accurate and responsive answer.

In some embodiments, the score of a possible answer is a multiplicative product of a plurality of factor values. In some embodiments, one or more of the factor values may be normalized values between 0 and 1, inclusive. The factors that are actually used in determining the score may vary by the QA type of the fact query that matched the possible answer. In some embodiments, because the score, being the product of factors that are between 0 and 1, inclusive, can remain the same or decrease towards 0 but never increase, the scoring for any particular possible answer may be aborted if the score for that particular answer decreases below a predefined threshold. This may be an indication that the possible answer is of such poor quality that further scoring would be wasteful.

In some embodiments, the factors may be based on the QA type, metrics of the fact that matched the fact query (such as a confidence metric and an importance metric), the agent that extracted the matching fact, the degree to which a field in the fact was matched by the fact query, the degree to which particular fields in the fact match the fact query completely, and so forth. It should be appreciated that the factors described above are merely exemplary and that other factors may be included in addition to the ones described above and some of the factors described above may be omitted.

After each possible answer is scored, the possible answers are gathered into a possible answer list, such as the possible answers list 400 described above, in relation to FIG. 4. In some embodiments, only a predefined number of top scoring answers are gathered into the possible answers list 400. For example, the possible answers list may include only the 100 highest scoring possible answers. In some embodiments, further processing of the possible answers list 400 is handled by the second search controller 118.

Continuing in FIG. 5B, a number of the highest scoring possible answers are identified from the possible answers list 400 (510). The number may be a predefined number that specifies how many top scoring answers will be further processed. As long as there are still identified top scoring possible answers to be processed (512—no), a next top scoring answer is processed. The processing involves identifying supporting answers for the respective top scoring answer (514) and determining a supported score for the respective top scoring answer based on the score of the respective top scoring answer and the scores of its supporting answers (516). The identification of supporting answers is discussed in more detail below.

In some embodiments, the supported score is determined by converting each of the scores of the top scoring answer and its supporting answers to odds space values. A score s is converted to an odds space value x.

$$x\left(\frac{s}{1-s}\right)$$

The converted values (i.e., the odds space conversions of the scores) are summed to generate to a value X, and that sum X is converted back to a probability space value to get the supported score S for the top scoring answer.

$$S = \left(\frac{X}{1+X}\right)$$

After the supported scores are determined for the identified top scoring answers (512—yes), the top scoring answer with the highest supported score (hereinafter "best supported answer") is identified (518). For the best supported answer, the top scoring answer within the list of possible answers that is contradictory to the best supported answer is identified (520). For that contradictory answer, a contradicting score C, which is the supported score for that contradictory answer, is determined (522). In addition, in some embodiments, the top scoring answer within the list of possible answers that is unrelated to the best supported answer is identified (524). For that unrelated answer, a unrelated score U, which is the supported score for that unrelated answer, is determined (526). It should be appreciated that the process for determining contradicting score C and unrelated score U are similar to the process for determining S: supporting answers are identified, the scores are converted to odds space values, the odds space values are summed, and the sum is converted back to a probability space value. The determination of contradictory and unrelated answers are described below.

Whether two possible answers are supporting, contradictory, or unrelated are based on comparisons of the fields of the two answers. Each answer's fields of interest, namely the name, attribute, and value, are grouped into an input and output. For example, in some embodiments, for a NA-V type query, the inputs are the name and the attribute and the output is the value. For an AV-N type query, the inputs are the attribute and the value and the output is the name. Two possible answers are compared by doing pair-wise comparisons of their input fields and their output fields. The comparison takes into account the type of data in the fields, that is, whether the data in the field is a string of words, a date, a number, and so forth. The source of the answer may also considered.

In some embodiments, the result of a pair-wise field comparison is one of five classifications. They are:
  not comparable: the fields have different data types (for example, strings of words vs. a date) and thus cannot be compared;
  not similar: the fields are of the same data type, but are not the same at all;
  somewhat similar: the fields have some similarity, but it is difficult to conclude if they may mean the same thing;
  very similar: the fields are nearly the same; and
  identical: the fields are exactly the same.

The actual determination of whether the fields are the same or not may differ by data type. For example, for numbers, if the numbers are small integers, then they must be exactly equal in order to be treated as the same. If the numbers are very large integers or floating point numbers, then they may be treated the same if they are within a certain percentage of each other.

Based on the pairwise field comparisons, the relationship between the two answers are classified:
  Two answers are classified as "complementary" if the answers came from the same source. Answers that are complementary to an answer A are ignored;
  Two answers are classified as "may support" (i.e., an answer A "may support" an answer B), if the answers have the identical or very similar inputs but the outputs are only somewhat similar. An answer A that "may support" an answer B is also ignored;
  Two answers are classified as "supporting" if the answers have identical or very similar inputs and identical or very similar outputs, unless the two answers came from the same source. The scores of "supporting" answers are part of the determination of the supported score;
  Two answers are "contradictory" if the inputs are identical or very similar but the outputs are not similar or are not comparable; and two answers are "unrelated" if the inputs are not similar or are not comparable.

The supported score S of the best supported answer is compared to a predefined threshold T (528). The threshold T is a minimum score that the supported score S must reach if the best supported answer is to be considered further. If S is less than or equal to T (528—no), then the processor(s) performing the processing shown in FIG. 5B (e.g., the second search controller 118 or the query engine 106) may generate a response indicating that the query engine 106 is unable to provide an answer (534). For example, the second search controller 118 may transmit a response to the query server 108 indicating that an answer is unavailable, and the query server 108 may generate and transmit a response to that effect to the client 102 for presentation to the user.

If S is greater than T (528—yes), then a check is made to see whether the supported score S of the best supported answer exceeds the best supported score C of a contracting answer by at least a first predefined margin. In one embodiment, this check is made by comparing S to the contradicting score C multiplied by a constant $\alpha$ (530). The constant $\alpha$ represents the minimum S to C ratio that must be achieved in order for the best supported answer to be selected as the best answer to the factual query. In other words, S has to be at least $\alpha$ times the contradicting score C. If S is less than $\alpha$C (530—no), then the processor(s) performing the processing shown in FIG. 5B (e.g., the second search controller 118 or the query engine 106) may generate a response indicating that the query engine 106 is unable to provide an answer (534).

If S is equal to or greater than $\alpha$C (530—yes), then another a check is made to see whether the supported score S of the best supported answer exceeds the best supported score U of an unrelated answer by at least a second predefined margin. In one embodiment, this check is made by comparing to the unrelated score U multiplied by a constant $\beta$ (532). The constant $\beta$ represents the minimum S to U ratio that must be achieve before the best supported answer may be selected as the best answer to the factual query. In other words, S has to be at least $\beta$ times the unrelated score U. If S is less than $\beta$U (532—no), then the processor(s) performing the processing shown in FIG. 5B (e.g., the second search controller 118 or the query engine 106) may generate a response indicating that the query engine 106 is unable to provide an answer (534). If S is equal to or greater than $\beta$U (532—yes), then the best supported answer is selected as the answer to the factual query and further processed, further details of which are described below in relation to FIG. 5C.

Continuing in FIG. 5C, after the best supported answer is selected as the best answer to the factual query, the query server 108 generates a response (536). The response may include the best supported answer. The response may include an identifier and/or a hyperlink (e.g., to a URL), for a source of the best supported answer. In some embodiments, the response may also include a link that, when clicked upon by a user at client 102, can generate a request for a list of the sources of the best supported answer. In some embodiments, the response may also include the results of a document search, such as a Web search, based on the user query. The document search results may be transmitted to the query server 108 from components of the query engine 106 that handle such searches, such as the first search controller 110. The response is transmitted to the client 102 for presentation to the user (538). An exemplary response including the answer and results of a document search using the user query is described in further detail below, in relation to FIG. 6.

The user, seeing the presented response at the client 102, may request a listing of the sources of the answer. In some embodiments, the user may make that request by clicking on a link included in the response (as described above) that generates the request for the sources listing upon being clicked.

The query engine 106 receives the request to list the sources of the answer (540). The sources of the answer are identified (542). In some embodiments, the sources of the answer may be identified by looking up the sources 220 (FIG. 2) of the answer fact in the fact repository 124. A snippet generation request is sent to the first search controller, along with the list of sources, the user query, the fact query 418 that matched the answer, and the answer. The snippet generation request is submitted to the first cache 112, the document index 114, and/or the document database 116. In some embodiments, if the list of sources is longer than a predefined limit, a subset of the list of sources may be selected by the first search controller 110 and submitted to the first cache 112, the document index 114, and/or the document database 116. The first cache 112, the document index 114, and/or the document database 116, or one or more processors to which the snippet generation request is submitted, generates a snippet for each of the listed sources (544). Each snippet may include one contiguous portion of text or a plurality of non-contiguous portions of text from the respective source. For a particular snippet, if the text portions chosen for inclusion in the snippet are not contiguous within the source, the portions may be separated by ellipses.

Each snippet is generated such that it includes as many terms of the user query and/or the fact query and as many terms of the answer as possible. The source may be analyzed for the scatter of query and answer terms (that is, how scattered the query terms and answer terms are in the source document) to assist in the generation of the snippet. The text portion or portions that yield the least query term and answer term scatter are selected for inclusion in the snippet.

A response that includes the snippets is generated (546). The response includes a list of sources and snippets of each source that includes the user/fact query terms and answer terms. The response may also include the answer, the user query, and hyperlinks to each source. The response is transmitted to the client 102 for presentation to the user (548).

In some embodiments, the user/fact query terms and answer terms in each snippet are highlighted to make them more prominent when the response is presented to the user. As used herein, highlighting of terms within the snippets refers to any manner of making the terms more prominent when presented to the user including, but not limited to, making the terms bold, underlining the terms, italicizing the terms, changing the font color of the terms, and/or adding background color to the local area of the terms. An exemplary response that includes the list of sources and the snippets is described in further detail below, in relation to FIG. 7.

In some embodiments, queries submitted to the query engine 106 may be represented by a URL that includes the user query terms and one or more other parameters. For example, a query for the terms "britney spears parents" may be represented by the URL "http://www.google.com/search?hl=en&q=britney+spears+parents". In some embodiments, a request to display a list of sources for the answer may be made by adding an additional parameter, such as "&fsrc=1" to the query URL. Thus, for the above URL, if the sources list for the answer to the query "britney spears parents" is desired, the query URL may look like "http://www-.google.com/search?hl=en&q=britney+spears+parents&fsrc=1". In some embodiments, the link in the response including the answer, that triggers a request for the sources list of the answer when clicked on by the user, is the query URL for the user query with the addition of the additional parameter.

In some other embodiments, the query engine 106 may accept, along with a factual query, a predefined special operator that instructs the query engine 106 to find an answer to the factual query and return the answer and a list of sources of the answer, without first returning a list of documents found using the query as input to a document search. For example, a user may enter "Z:X of Y," with "Z:" being the special operator, to instruct the query engine 106 to find answers to the factual query "X of Y" and list the sources of the answer. In a sense, use of the operator along with the query merges the query with a request for a list of sources of whatever answer may be found for the query. In some embodiments, the link in a response that generates a request to list the sources of the answer, as described above, adds the special operator to the original query and submits the query with the special operator to the query engine 106 when that link is selected (e.g., clicked) by the user.

Figure 6:
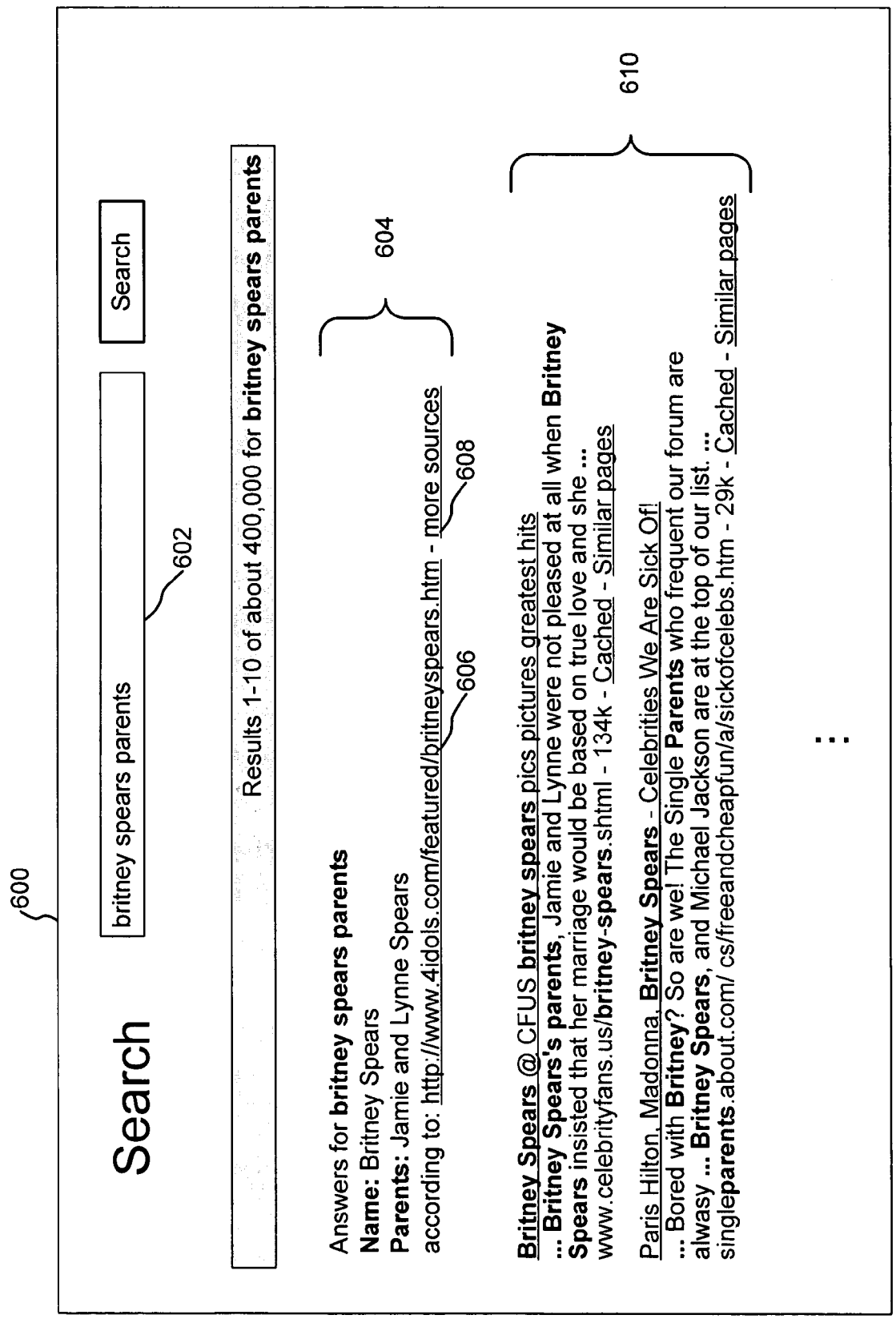
FIG. 6 illustrates a presentation of an answer to a factual query, according to some embodiments of the invention.

FIG. 6 illustrates an exemplary response, as presented to the user at client 102, to a factual query that includes the answer and results of a document search using the factual query as input, according to some embodiments of the invention. The response 600 may show a search box 602 with the original user query. The response 600 includes the answer for the query 604, a hyperlink to a source of the answer 606, and a link 608 that, when clicked upon by the user, triggers a request for a list of sources for the answer. In some embodiments, the link 608 may be the query URL for the user query with the addition of the source list request parameter, as described above. In some embodiments, the link that, when clicked on by the user, triggers a request for a list of sources for the answer may be omitted in the response 600 if the answer fact 604 has only one source in the fact repository 124. The response may also include a list of results 610 of a document search, such as a Web search, using the factual query as input.

Figure 7:
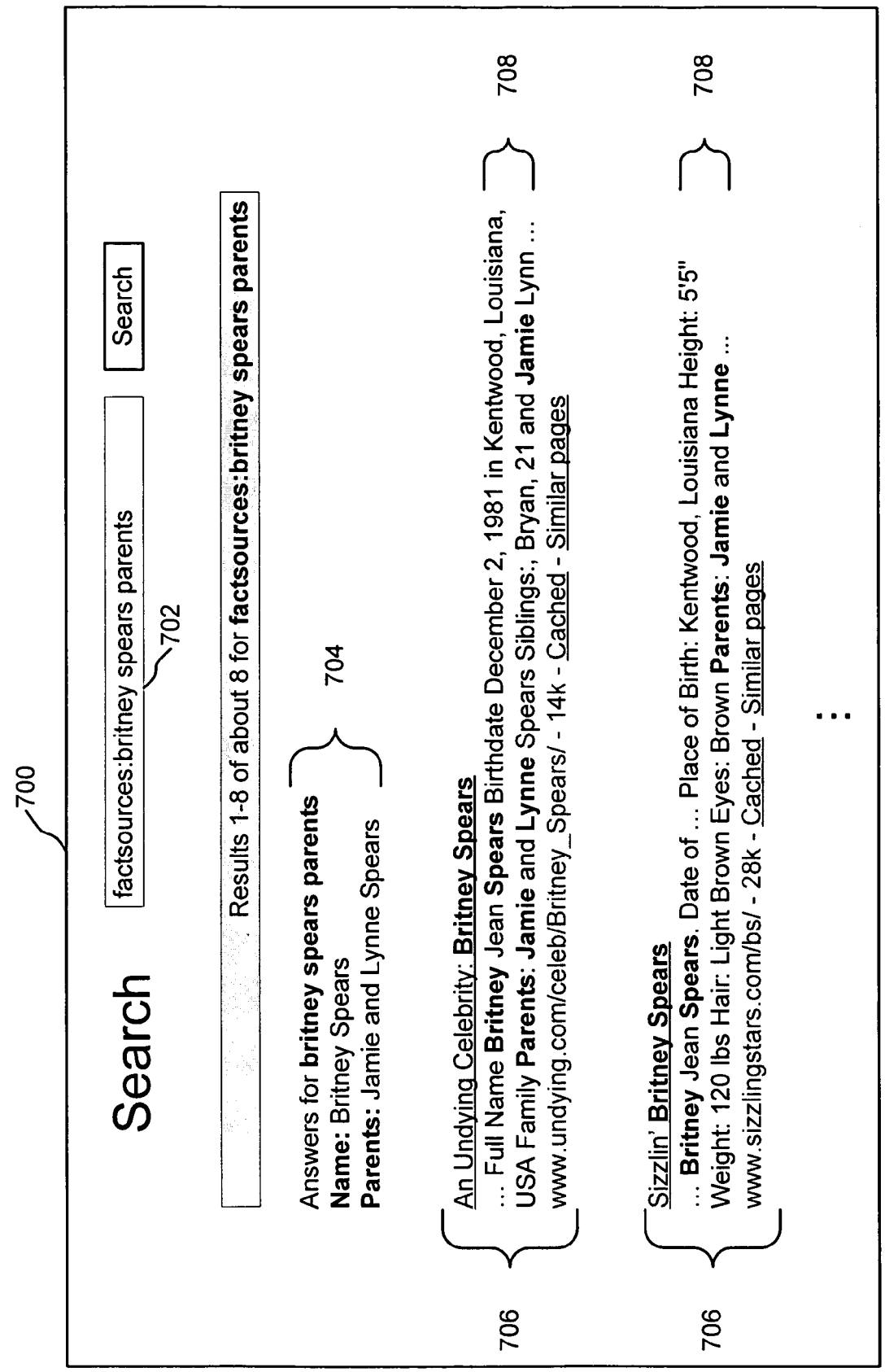
FIG. 7 illustrates a presentation of a list of sources of an answer to a factual query, according to some embodiments of the invention.

FIG. 7 illustrates an exemplary response to a request for a list of sources of an answer, according to some embodiments of the invention. The response 700 may include a search box 702 with the original user query. In some embodiments, the search box 702 may also include the special operator, as described above, that may be used along with a factual query to requests a list of sources. For example, in search box 702, "factsources:" is the special operator and "britney spears parents" is the original user query. In some other embodiments, the operator may be omitted from the presentation of the query in the search box if, for example, the trigger of the request for a list of sources is the user clicking on a link, such as the link 608, that included the query URL with the sources list request parameter. The response may also include the answer 704 to the fact query, and a list of one or more sources 706 for the answer, along with URL's, hyperlinks, and snippets 708 for each source. In some embodiments, within each snippet 708, the query terms and answer terms may be highlighted. In the snippets 708, the query terms and answer terms are highlighted by making them bold.

Figure 8:
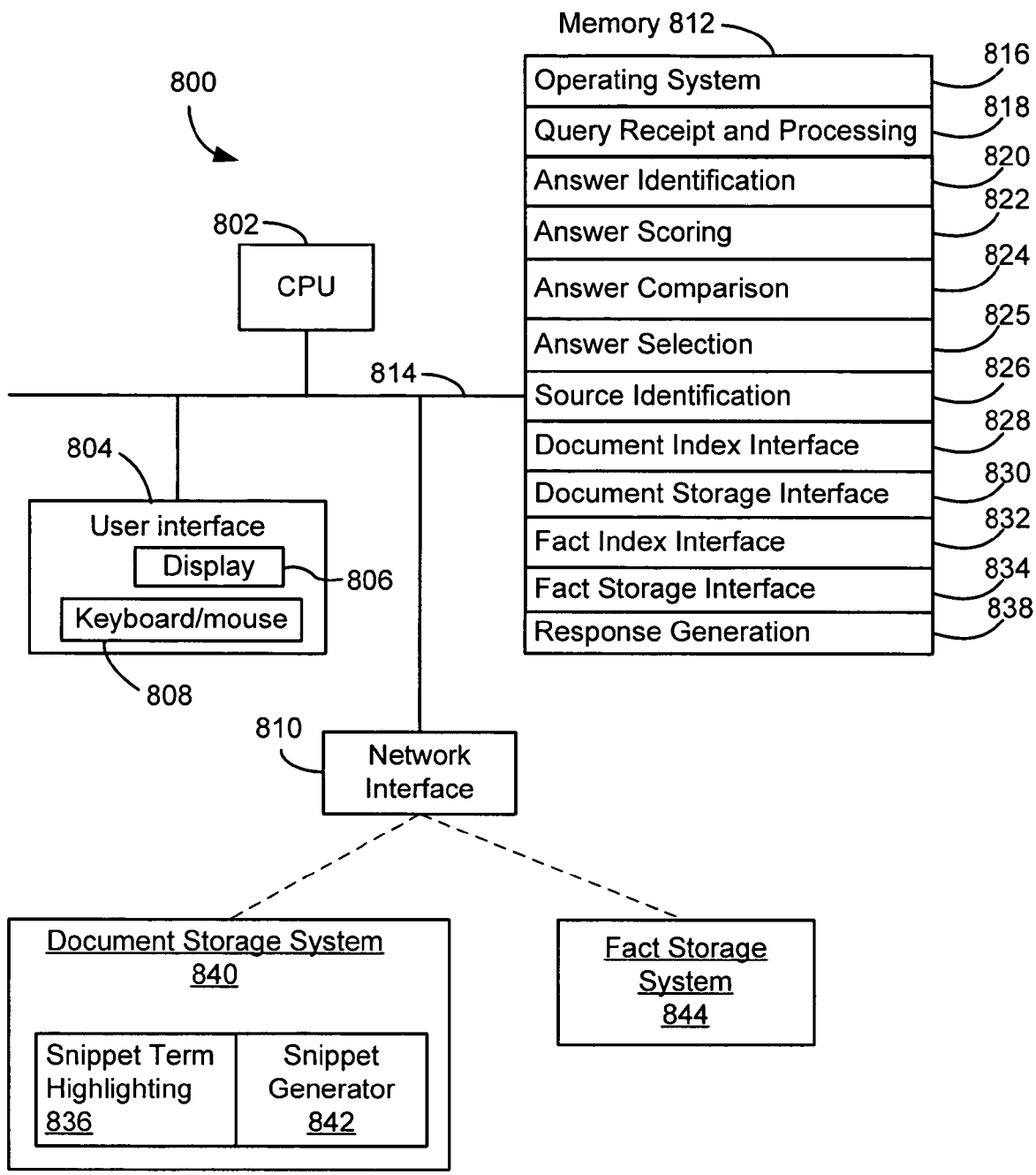
FIG. 8 illustrates a system for selecting an answer to a factual query and displaying the answer and a list of sources of the answer, according to some embodiments of the invention.

FIG. 8 is a block diagram illustrating a factual query answering system 800, according to some embodiments of the invention. The system 800 typically includes one or more processing units (CPU's) 802, one or more network or other communications interfaces 810, memory 812, and one or more communication buses 814 for interconnecting these components. The system 800 optionally may include a user interface 804 comprising a display device 806 and a keyboard/mouse 808. The memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 812 may optionally include one or more storage devices remotely located from the CPU(s) 802. In some embodiments, the memory 812 stores the following programs, modules and data structures, or a subset thereof:

- an operating system 816 that includes procedures for handling various basic system services and for performing hardware dependent tasks;
- a query receipt and processing module 818 for receiving queries and processing queries, such as parsing the queries to determine the QA type and generating fact queries;
- an answer identification module 820 for identifying possible answers to a factual queries;
- an answer scoring module 822 for determining scores and supported scores for answers;
- an answer comparison module 824 for comparing answers to determine if they are supporting, contradictory, and so forth;
- an answer selection module 825 for selecting a possible answer as the answer to present to the user;
- a source identification module 826 for identifying sources of an answer;
- a document index interface 828 for interfacing with a document index when searching for documents;
- a document storage interface 830 for interfacing with a document storage system when requesting and receiving snippets;
- a fact index interface 832 for interfacing with a fact index when searching for facts;
- a fact storage interface 834 for interfacing with a fact storage system; and
- a response generation module 838 for generating responses to be transmitted to the client 102.

In some embodiments, memory 812 of system 800 includes the fact index instead of an interface 832 to the fact index. The system 800 also includes a document storage system 840 for storing contents of documents, some of which may be sources for answer facts. The document storage system includes a snippet generator 842 for accessing the contents of documents and generating snippets from the contents and a snippet term highlighting module 836 for highlighting query terms and answer terms within snippets. The system 800 also includes a fact storage system 844 for storing facts. Each fact stored in the fact storage system 844 includes a corresponding list of sources from which the respective fact was extracted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Although FIG. 8 shows a factual query answering system, FIG. 8 is intended more as functional description of the various features which may be present in a set of servers than as a structural schematic of the embodiments described herein.

In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a factual query answering system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for displaying sources of a fact, comprising:
   receiving a user-formulated factual query, the factual query including one or more query terms;
   identifying, from a fact repository, an answer to the factual query, the answer including one or more factual answer terms and information identifying source documents that include one or more query terms of the factual query and one or more of the factual answer terms of the answer;
   additionally, searching a document database distinct from the fact repository to identify documents matching the user formulated factual query;
   after identifying the answer, accessing at least one of the source documents in the document database distinct from the fact repository;
   generating a snippet for at least one of the source documents, the snippet including one or more query terms of the factual query and one or more of the factual answer terms of the answer; and
   generating a response including the snippet, wherein the snippet itself provides factual information that answers the factual query and information identifying at least a subset of the documents of the documents identified from the document database.

2. The method of claim 1, wherein generating a response further comprises highlighting within the snippet the one or more terms of the factual query and the one or more factual answer terms of the answer.

3. The method of claim 1, further comprising responding to a user selection of a link within a displayed representation of the answer to the factual query.

4. The method of claim 1, wherein the response includes a user-selectable link for requesting a list of the source documents, the method further comprising responding to user selection of the link by sending a list of the source documents.

5. The method of claim 1, wherein generating the response includes determining a proximity of the one or more query terms and the one or more factual answer terms in at least one of the source documents.

6. The method of claim 1, wherein identifying the answer includes identifying a respective factual answer term that comprises one or more words or numbers, and wherein generating the snippet includes: identifying a text portion of a respective source document that includes the identified factual answer term and generating the snippet so as to include the identified text portion that includes the identified respective factual answer term.

7. A system for displaying sources of a fact, comprising:
   one or more processors;
   memory; and
   one or more programs stored in the memory, the one or more programs comprising instructions for implementing:
   a query receiver to receive a user-formulated factual query, the factual query including one or more query terms and information identifying source documents that include one or more query terms of the factual query and one or more of the factual answer terms of the answer;
   said answer identifier additionally searching a document database distinct from the fact repository to identify documents matching the user formulated factual query;
   an answer identifier to identify, from a fact repository, an answer to the factual query, the answer including one or more factual answer terms;
   a source document identifier, for execution after the answer identifier identifies the answer, to access at least one of the source documents in the document database distinct from the fact repository;
   a snippet generator to generate a snippet for at least one of the source document, the snippet including one or more query terms of the factual query and one or more of the factual answer terms of the answer; and
   a response generator to generate a response including the snippet, wherein the snippet itself provides factual information that answers the factual query and information identifying at least a subset of the documents of the documents identified from the document database.

8. The system of claim 7, wherein the response generator further includes instructions to highlight within the generated snippet the one or more terms of the factual query and the one or more factual answer terms of the answer.

9. The system of claim 7, wherein the response includes a user-selectable link for requesting a list of the source documents, and the query receiver further includes instructions to respond to user selection of the link by sending a list of the source documents.

10. The system of claim 7, wherein the snippet generator further comprises a proximity detector to detect a proximity of the one or more query terms and of the one or more factual answer terms in at least one of the source documents.

11. The system of claim 7, wherein the answer identifier is configured to identify a respective factual answer term that comprises one or more words or numbers, and wherein the snippet generator is configured to identify a text portion of a respective source document that includes the identified factual answer term and to generate the snippet so as to include the identified text portion that includes the identified respective factual answer term.

12. A system for displaying sources of a fact, comprising:
   one or more processors;
   memory; and
   one or more programs stored in the memory, the one or more programs comprising instructions for implementing:
   means for receiving a user-formulated factual query, the factual query including one or more query terms;
   means for identifying, from a fact repository, an answer to the factual query, the answer including one or more factual answer terms;

and information identifying source documents that include one or more query terms of the factual query and one or more of the factual answer terms of the answer;

means for searching a document database distinct from the fact repository to identify documents matching the user formulated factual query;

means for, after identifying the answer, accessing at least one of the source documents in the document database distinct from the fact repository;

means for generating a snippet for at least one of the source documents, the snippet including one or more query terms of the factual query and one or more of the factual answer terms of the answer; and means for generating a response including the snippet, wherein the snippet itself provides factual information that answers the factual query and information identifying at least a subset of the documents of the documents identified from the document database.

13. A computer program product for use in conjunction with a computer system, the computer program product comprising a computer readable storage medium and a computer program mechanism embedded therein, the computer program mechanism comprising one or more programs to be executed by the computer, the one or more programs including instructions for:

receiving a user-formulated factual query, the factual query including one or more query terms;

identifying an answer, from a fact repository, to the factual query, the answer including one or more factual answer terms and information identifying source documents that include one or more query terms of the factual query and one or more of the factual answer terms of the answer;

additionally, searching a document database distinct from the fact repository to identify documents matching the user formulated factual query;

after identifying the answer, accessing at least one of the source documents in the document database distinct from the fact repository;

generating a snippet for at least one of the source documents, the snippet including one or more query terms of the factual query and one or more of the factual answer terms of the answer; and generating a response including the snippet, wherein the snippet itself provides factual information that answers the factual query and information identifying at least a subset of the documents of the documents identified from the document database.

14. The computer program product of claim 13, the computer program mechanism further comprising instructions for highlighting within the snippet the one or more query terms of the factual query and the one or more factual answer terms of the answer.

15. The computer program product of claim 13, wherein the response includes a user-selectable link for requesting a list of the source documents, the computer program mechanism further comprising instructions for responding to user selection of the link by sending a list of the source documents.

16. The computer program product of claim 13, wherein the instructions for generating the snippet include instructions for determine a proximity of the one or more query terms and the one or more factual answer terms in at least one of the source documents.

17. The computer program product of claim 13, wherein the instructions for generating the snippet comprise instructions for selecting text from a respective source document so as to include in the snippet at least one textual term of the factual query and at least one textual term of the answer.

18. The computer program product of claim 13, wherein the instructions for identifying the answer includes instructions for identifying a respective factual answer term that comprises one or more words or numbers, and wherein the instructions for generating the snippet include instructions for identifying a text portion of a respective source document that includes the identified factual answer term and for generating the snippet so as to include the identified text portion that includes the identified respective factual answer term.

* * * * *

UNITED STATES PATENT AND TRADEMARK OFFICE
CERTIFICATE OF CORRECTION

PATENT NO.        : 7,587,387 B2                              Page 1 of 1
APPLICATION NO.   : 11/097689
DATED             : September 8, 2009
INVENTOR(S)       : Hogue It is certified that error appears in the above-identified patent and that said Letters Patent is hereby corrected as shown below:

In the Claims:

Column 15, line 46, please delete "of the documents".

Column 16, line 11, after "query terms" please add -- ; -- and delete "and".

Column 16, line 12, please add as a subparagraph -- an answer identifier to identify, from a fact repository, an answer to the factual query, the answer including one or more factual answer terms and --.

Column 17, line 17, please delete "of the documents".

Column 18, line 8, please delete "of the documents".

Column 18, line 22, please delete "determine" and add -- determining --.

Column 18, line 17, please delete "includes" and add -- include --.

Signed and Sealed this

Tenth Day of November, 2009

David J. Kappos
*Director of the United States Patent and Trademark Office*